W. F. BARNES.

Converting Motions.

No. 6674 Reissued Oct. 5, 1875

Witnesses:
J. Mason Gozler
Alex^d J. Smith

Inventor:
Wm. Fletcher Barnes
By N. Crawford
atty.

AM. PHOTO-LITHOGRAPHIC Co. N.Y. (OSBORNE'S PROCESS)

UNITED STATES PATENT OFFICE.

WILLIAM FLETCHER BARNES, OF ROCKFORD, ILLINOIS, ASSIGNOR OF ONE-HALF INTEREST TO JOHN BARNES, OF SAME PLACE.

IMPROVEMENT IN DEVICES FOR CONVERTING MOTION.

Specification forming part of Letters Patent No. 146,636, dated January 20, 1874; reissue No. 6,674, dated October 5, 1875; application filed August 6, 1875.

*To all whom it may concern:*

Be it known that I, WILLIAM FLETCHER BARNES, of Rockford, in the county of Winnebago and State of Illinois, have invented certain new and useful Improvements in Mechanical Movements, of which the following is a specification:

My invention relates to mechanism for converting an oscillating or treadle motion into an intermittent or continuous rotary motion.

The subject-matter claimed will hereinafter specifically be designated.

Figure 1:
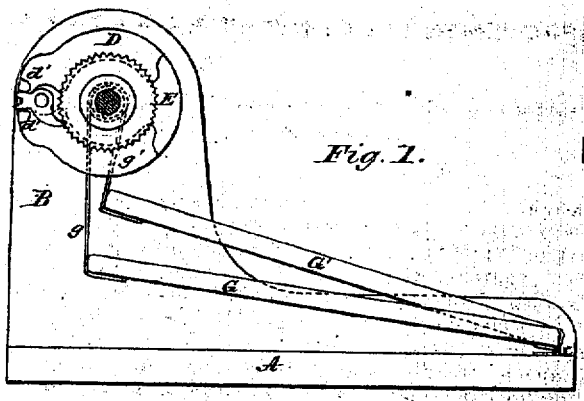
Figure 5:
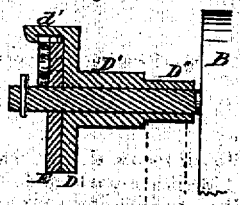
Figure 2:
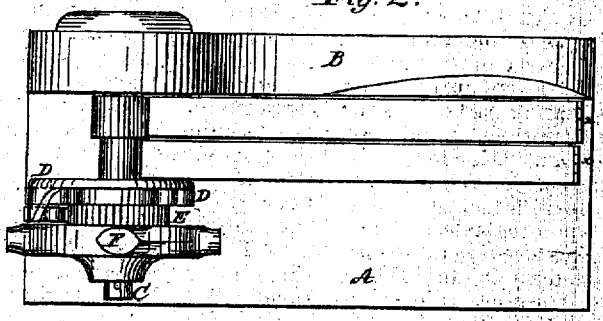
Figure 3:
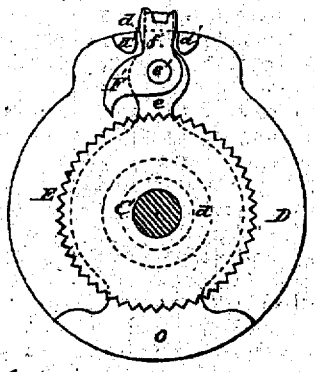
Figure 4:
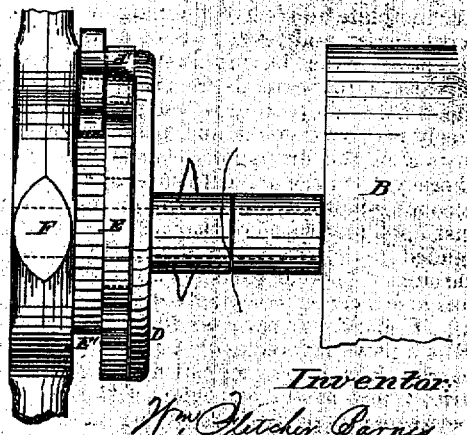

In the accompanying drawings, Figure 1 is a side elevation of so much of my improved apparatus as is necessary to illustrate the invention; Fig. 2, a plan or top view thereof; and Fig. 3, a horizontal section therethrough on the line *x x* of Fig. 1.

The mechanism is mounted on an axle C, firmly fixed in a suitable frame, shown in the drawings as consisting of a bed or base, A, and an upright, B. A driving-sleeve, D, having a disk or flange, D′, turns freely upon this axle, and is divided transversely into sections $d$ $d^1$, the diameters of which are different, and upon which flexible driving-straps $g$ $g'$ are secured and wound in opposite directions, the other ends of the straps being attached each to its respective treadle G G′ pivoted on the base A. A wheel, E, turning freely on the axle C, has its hub extended laterally in the form of steps or shoulders, one, $e$, of which constitutes a ratchet, and the other, $e'$, the seat of a pawl-carrier, F, turning freely thereon. An elbow-lever pawl, H, rocks on a stud, I, projecting from the face of the pawl-carrier, and engages with the teeth of the ratchet. A counter-balance, $f$, counterpoises the weight of the pawl. A tang or arm, $f'$, on the pawl end of the pawl-carrier works loosely between the lugs $d^2$ $d^3$ on the driving-disk D′, while the lever end of the pawl works tightly between said lugs.

In operating this device, commencing with the parts in the position shown in Fig. 1, the operator depresses treadle G, causing the sleeve D and disk D′ to turn backward on its axis. The lever end of the pawl, fitting tightly between the lugs on the disk, is instantly released from the ratchet, and a moment later the pawl-carrier is retracted by the lug $d^3$ striking its tang or arm. The strap $g'$ is simultaneously wound upon the sleeve as the one $g$ unwinds. When the treadle G has been depressed to its full extent, the treadle G′, which has been carried by its strap to its highest point, is in turn depressed, and the motion of the sleeve and disk is consequently reversed. The forward movement of the disk instantly engages the pawl with the ratchet, thus carrying the driven wheel E along with it. Thus, by repetition of these movements, a rotary motion is given to said wheel.

As the shoulder $d^1$ of the sleeve is smaller than the corresponding one, $d$, it follows that the backward movement of the pawl is more rapid than the forward one, by which means the time when the pawl is out of action is shorter, and more power is exerted upon the driving-sleeve during its forward movement.

It is obvious that under the arrangement hereinbefore described the rotation of the driven wheel E would be somewhat intermittent; but by duplicating the parts, so that when the pawl is retracted from contact with the ratchet on one side of the driven wheel, another pawl will engage teeth on the opposite side of the wheel, and thus convert the intermittent rotatory movement into one of continuous revolution.

Instead of operating the treadles by foot-power, a revolving shaft can be used, having cams upon it alternately to depress the treadles.

Having thus described my invention, what I claim, and desire to secure by Letters Patent, is—

1. The driving-wheel, constructed as described, with a smooth-surfaced shoulder for the reception of a pawl-carrier and pawl, and a ratchet-wheel, in which the pawl engages, between the wheel and shoulder.

2. The driving mechanism hereinbefore described, consisting of the combination of the sleeve, its disk or flange, the pawl-carrier, and the pawl mounted thereon, both operated by the disk, as set forth.

3. The combination, substantially as hereinbefore set forth, of the treadles, their straps, the driving-sleeve around which they pass in opposite directions, the disk on the sleeve, and a pawl-carrier and pawl operated thereby.

4. The mechanical movement hereinbefore described, consisting of the combination of a shaft, a driven wheel mounted thereon, a driving-disk or flanged sleeve, an independent pawl-carrier, and a pawl mounted thereon driven by the disk, and acting upon the driven wheel, substantially as hereinbefore set forth.

5. The combination, substantially as hereinbefore set forth, of the driving-disk, the independent pawl-carrier, and the pawl pivoted thereon.

W. FLETCHER BARNES.

Witnesses:
S. N. TALCOTT,
E. K. CONKLING.